(No Model.) 2 Sheets—Sheet 1.

W. W. GRISCOM.
ELECTRIC MOTOR.

No. 307,387. Patented Oct. 28, 1884.

WITNESSES:
Jas. L. Skidmore
Albert Popkins

INVENTOR:
William W. Griscom
by his Attorneys
Howson & Sons (No Model.)  W. W. GRISCOM.  2 Sheets—Sheet 2.
ELECTRIC MOTOR.

No. 307,387.  Patented Oct. 28, 1884.

Witnesses
John E. Parker
James J. Tobin

Inventor
William W. Griscom
by his Attys
Howson & Sons

UNITED STATES PATENT OFFICE.

WILLIAM W. GRISCOM, OF PHILADELPHIA, PENNSYLVANIA.

ELECTRIC MOTOR.

SPECIFICATION forming part of Letters Patent No. 307,387, dated October 28, 1884.

Application filed June 18, 1883. (No model.)

*To all whom it may concern:*

Be it known that I, WILLIAM W. GRISCOM, a citizen of the United States, and a resident of Philadelphia, Pennsylvania, have invented certain Improvements in Electric Motors, of which the following is a specification.

The main feature of my invention consists of improvements in the construction of electric motors whereby their efficiency is increased, as more fully described hereinafter.

In the accompanying drawings my invention is shown as applied to an electric motor of the type described in the Letters Patent No. 227,622, granted to me May 18, 1880; but it should be understood that the present improvements are applicable to other forms of motors.

Figure 1:
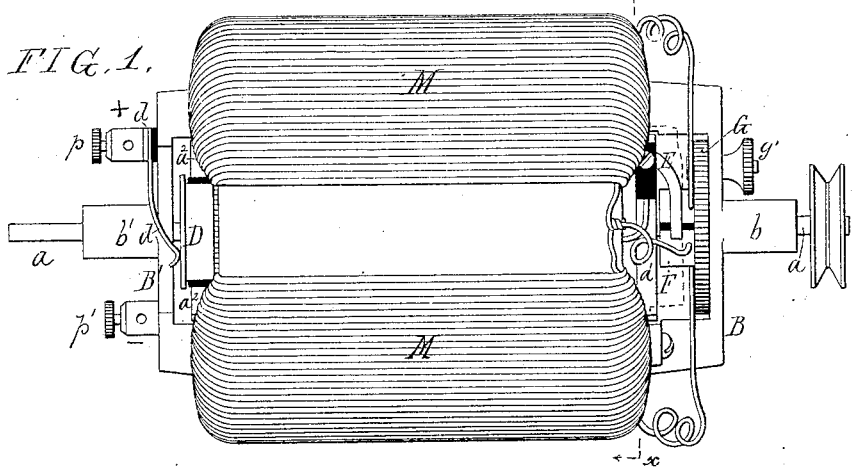
Figure 2:
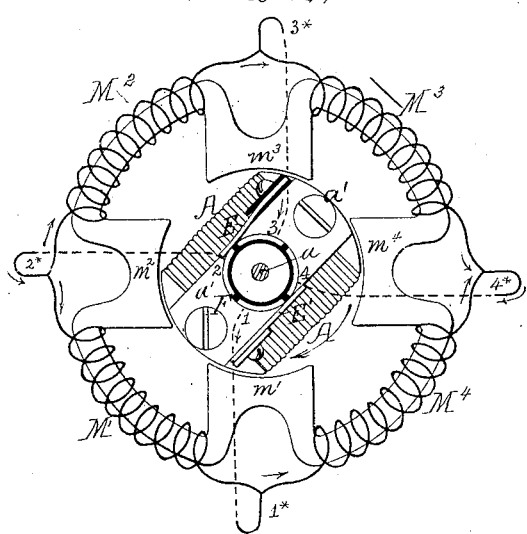
Figure 3:
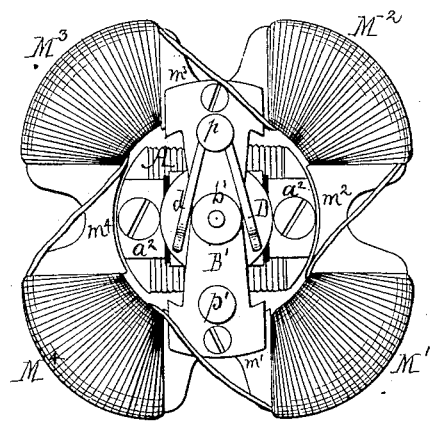
Figure 4:
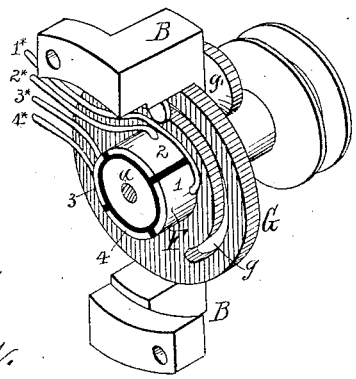
Figure 5:
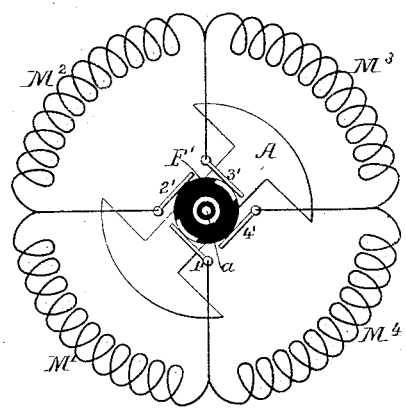
Figure 6:
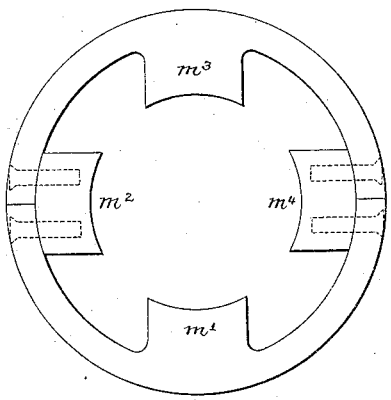

Figure 1 is a side view of the motor. Fig. 2 is a sectional diagram at the commutating end of the motor on the line $x\,x$, Fig. 1. Fig. 3 is a view of the opposite end of the machine. Fig. 4 is a perspective view of the form of commutator I prefer to use. Fig. 5 is a diagram illustrating a modified form of commutating device. Fig. 6 is a view illustrating a method of building the iron core.

In electric motors as usually constructed the armature is provided with at least as many poles as are the field-magnets, and often with more.

The main feature of my present invention consists in constructing the motor with an electro-magnetic field surrounding the periphery of the armature and having a number of poles a multiple of those on the armature, and combining with the field-magnets a commutating device for changing the polarities of the poles of the field electro-magnets as the armature revolves, and while all the coils are actively in circuit, so that the entire magnetic effect is concentrated only in as many poles at a time as there are poles on the armature.

In the drawings I have shown my invention in its simplest form, the field-magnets being provided with twice as many poles $m'\,m^2\,m^3\,m^4$ as has the armature A. The latter is shown in the form of the well-known Siemens armature with two poles, and having its axis $a$ mounted in bearings $b\,b'$ in the non-magnetic cross-bars or frame-pieces B B', secured to the iron core of the field-magnets. One of the terminals of the armature-coils is connected to an insulated disk or ring, D, Figs. 1 and 3, secured to one end piece, $a^2$, of the armature, while the other terminal is connected to an insulated contact-brush, E, Fig. 2, carried by the other end piece, $a'$, of the armature. On the disk D bear the spring contact-arms $d$, which are carried by but insulated from the cross-bar B', and electrically connected to an insulated binding-post, $p$, for one of the terminals of the battery or generating circuit. A second binding-post, $p'$, Figs. 1 and 3, for the other terminal of the battery or generating circuit, is electrically connected through to the metal frame, or by other means, to the contact-piece E'. The end piece $a'$ of the rotary armature carries the second contact-piece, E', electrically connected with its core, and through that with the post $p'$. The two contact-pieces E E' bear at diametrically opposite points on a stationary commutator-cylinder, F, Figs. 1, 2, and 4, which is carried by an insulated disk, G, mounted on a sleeve on the cross-bar B, Fig. 4, through the center of which the axis $a$ of the armature passes. This commutator is provided with four insulated plates, 1 2 3 4, to which are electrically connected the respective terminals 1\* 2\* 3\* 4\* from the junctions of the four field-coils M' M² M³ M⁴, as indicated in Fig. 2. Suppose the armature to be in the position shown in Fig. 2 for a moment in its revolution in the direction of the arrow, and the brush E just about to leave contact with commutator-plate 2, and E' about to leave plate 4. The circuit at the moment enters, say, at the insulated post $p$, and thence is through the disk D, armature-coils, brush E, plate 2, and conductor 2\* to the junction of the latter with the field-coils M' M², whence half the current passes through the upper coils, M² M³, while the other half goes through the lower coils, M' M⁴, and the two unite again at 4\*, thence to the plate 4, brush E', and through the frame out at post $p'$. The circuit through the armature remains unchanged and uninterrupted, no matter what its position, and its poles therefore do not change polarities; but as soon as the brushes E E' pass from one pair of plates to another the field-circuit is changed and the poles of the field change their polarities. Thus with the circuit as described the poles $m^3\,m'$ are neutral, while the poles $m^2\,m^4$ are active north and south; but as soon as the brushes E E' come into contact with the plates 3 and 1, respectively, the field-circuit is through the conductor $3^*$, one half through the coils $M^2$ $M'$ and the other half through the coils $M^3$ $M^4$, and thence united through the conductor $1^*$ to the plate 1, so that the poles $m^2$ $m^4$ become neutral, and the poles $m^3$ $m'$ actively north and south. Thus each pair of diametrically-opposite poles of the field is rendered alternately active and inactive and cause the rotation of the armature, whose poles remain unchanged.

In order to permit variation in the moment of reversal or change of the circuit, or even change the direction of rotation of the armature, I provide the insulating-disk G with a segmental slot, $g$, through which passes the retaining screw bolt, with its nut $g'$, as will be readily understood.

Instead of making the commutating or circuit-changing device with a fixed commutator and rotating brushes, I may, as indicated in the diagram, Fig. 5, mount a commutator, F', with two contacts on the armature, and have four fixed brushes, 1', 2', 3', and 4', to which the junction-wires of the field-coils $M'$ $M^2$ $M^3$ $M^4$ are respectively connected.

Although I have only shown and described the field-magnets as having twice as many poles as the armature has, they may be provided with any number which is a multiple of the number of poles on the armature, there being of course a corresponding change in the number of commutator plates or brushes.

In constructing the core of the field-magnets, instead of making it all in one piece, as indicated in Fig. 2, it may be made in two or more segments, each having a pole, $m'$, (or $m^3$,) made in one piece with it, so that the coils may be slipped on the legs on opposite sides of this pole, and then the intermediate poles, $m^2$ $m^4$, may be made a means of uniting the segments, as indicated in said Fig. 6.

I claim as my invention—

1. In an electric motor, the combination of a rotary electro-magnet or armature with a stationary electro-magnet or field surrounding the periphery of the armature, and having a number of poles a multiple of those on the armature, and commutating devices for changing the polarities of the poles of the stationary electro-magnet, substantially as described.

2. In an electric motor, the combination of a rotary armature carrying contact-brushes, with stationary field-magnets surrounding the periphery of the armature, and having a number of poles a multiple of those on the armature, and a stationary commutator to which the respective field-coils are connected, substantially as set forth.

3. The combination of the field-magnet and commutator to which its coils are connected, with an armature carrying at one end contact-brushes for the commutator, and at the other a disk or ring, D, and contacts $d$, substantially as described.

4. An electric motor having a cylindrical magnet-core made in two or more segments united by pole-pieces, substantially as specified.

In testimony whereof I have signed my name to this specification in the presence of two subscribing witnesses.

W. W. GRISCOM.

Witnesses:
 HARRY L. ASHENFELTER,
 HARRY SMITH.